(12) United States Patent
Matsumoto (10) Patent No.: US 11,693,161 B2
(45) Date of Patent: Jul. 4, 2023

(54) DIFFRACTIVE OPTICAL ELEMENT, METHOD FOR PRODUCING DIFFRACTIVE OPTICAL ELEMENT, OPTICAL DEVICE, AND IMAGE PICKUP APPARATUS

(71) Applicant: CANON KABUSHIKI KAISHA, Tokyo (JP)

(72) Inventor: Mamo Matsumoto, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 265 days.

(21) Appl. No.: 17/095,533

(22) Filed: Nov. 11, 2020

(65) Prior Publication Data

US 2021/0157040 A1   May 27, 2021

(30) Foreign Application Priority Data

Nov. 26, 2019   (JP) .................................. 2019-213739

(51) Int. Cl.
*G02B 5/18* (2006.01)
*C08G 75/045* (2016.01)
*C08F 220/30* (2006.01)

(52) U.S. Cl.
CPC ........ *G02B 5/1842* (2013.01); *C08F 220/303* (2020.02); *C08G 75/045* (2013.01); *G02B 5/1857* (2013.01)

(58) Field of Classification Search
CPC .. G02B 5/1842; G02B 5/1857; G02B 5/1852; G02B 5/1895; G02B 1/04; G02B 27/4205; C08F 220/303; C08F 126/06; C08F 222/1067; C08G 75/045; C09D 4/00
See application file for complete search history.

(56) References Cited

U.S. PATENT DOCUMENTS

2008/0107903 A1* 5/2008 Miyakawa ........... G02B 5/1852
522/180
2014/0343235 A1* 11/2014 Jeong ..................... C08G 75/16
205/211

FOREIGN PATENT DOCUMENTS

JP        2005-107298 A    4/2005

* cited by examiner

*Primary Examiner* — Mariam Qureshi
(74) *Attorney, Agent, or Firm* — Canon U.S.A., Inc., IP Division (57) ABSTRACT

Diffractive optical element includes two resin layers stacked on first substrate. One of the two resin layers is cured article of first resin containing thiol group and sulfide group, the cured article having diffraction grating shape. The other is cured article of second resin, the cured article having diffraction grating shape. When measurement is performed by laser Raman spectroscopy, $\alpha<\beta$, where $\alpha$ is the ratio of the intensity of peak corresponding to the sulfide group to the intensity of peak corresponding to the thiol group in first region containing no interface between the cured articles of the first and second resins, and $\beta$ is the ratio of the intensity of peak corresponding to the sulfide group to the intensity of peak corresponding to the thiol group in second region containing the interface.

18 Claims, 6 Drawing Sheets

DIFFRACTIVE OPTICAL ELEMENT, METHOD FOR PRODUCING DIFFRACTIVE OPTICAL ELEMENT, OPTICAL DEVICE, AND IMAGE PICKUP APPARATUS

BACKGROUND OF THE INVENTION

Field of the Invention

The present disclosure relates to a diffractive optical element used for cameras and camcorders and a method for producing the diffractive optical element. The present disclosure also relates to an optical device and an image pickup apparatus including the diffractive optical element.

Description of the Related Art

Hitherto, diffractive optical elements containing two resins having different optical characteristics have been known as diffractive optical elements used for lenses and so forth. Japanese Patent Laid-Open No. 2005-107298 discloses a diffractive optical element made from an ultraviolet-curable resin composed of a thiol-ene reaction product of an acrylate having an aliphatic ring and an ultraviolet-curable resin composed of a fluorine-containing acrylate and an acrylate having multiple benzene rings.

SUMMARY OF THE INVENTION

According to one aspect of the present disclosure, a diffractive optical element includes a first substrate and two resin layers stacked on the first substrate, in which one of the two resin layers is a first resin layer having a diffraction grating shape and containing a thiol group and a sulfide group, in which the other of the two resin layers is a second resin layer having a diffraction grating shape, in which when measurement is performed by laser Raman spectroscopy, $\alpha<\beta$, where $\alpha$ is the ratio of the intensity of a peak corresponding to the sulfide group to the intensity of a peak corresponding to the thiol group in a first region of the first resin layer, the first region containing no interface between the first resin layer and the second resin layer, and $\beta$ is the ratio of the intensity of a peak corresponding to the sulfide group to the intensity of a peak corresponding to the thiol group in a second region containing the interface between the first resin layer and the second resin layer, the second region being smaller than the total thickness of the two resin layers.

According to another aspect of the present disclosure, a method for producing a diffractive optical element includes forming a first resin layer having a diffraction grating shape by disposing a thiol group-containing first resin composition on a first substrate, and forming a second resin layer having a diffraction grating shape by disposing a second resin composition on the first resin layer, in which in forming the second resin layer, the second resin composition is cured to satisfy $\alpha<\beta$, where $\alpha$ is the ratio of the intensity of a peak corresponding to a sulfide group to the intensity of a peak corresponding to the thiol group in a first region of the first resin layer, the first region containing no interface between the first resin layer and the second resin layer, and $\beta$ is the ratio of the intensity of a peak corresponding to the sulfide group to the intensity of a peak corresponding to the thiol group in a second region containing an interface between the first resin layer and the second resin layer, the second region being smaller than the total thickness of the two resin layers, these peaks being measured by laser Raman spectroscopy.

Further features of the present disclosure will become apparent from the following description of exemplary embodiments with reference to the attached drawings.

DESCRIPTION OF THE EMBODIMENTS

Diffractive Optical Element

First Embodiment

Figure 1A:
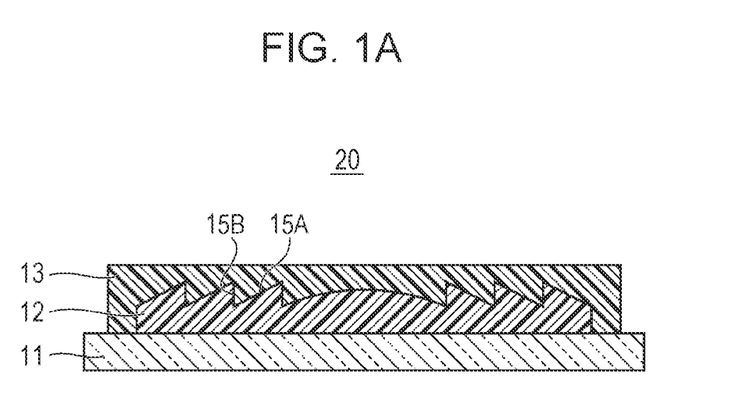
FIGS. 1A and 1B are schematic views of a diffractive optical element according to an embodiment of the present disclosure.
Figure 1B:
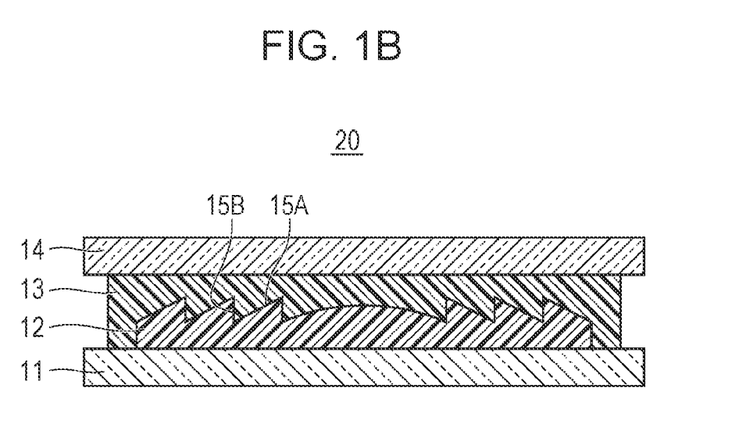

Embodiments for carrying out the present disclosure will be described below with reference to the drawings. FIGS. 1A and 1B are schematic cross-sectional views illustrating a diffractive optical element 20 according to a first embodiment. As illustrated in FIG. 1A, the diffractive optical element 20 can include a cured article 12 of a first resin and a cured article 13 of a second resin stacked on a first substrate 11. Hereinafter, for convenience of explanation, the cured article of the first resin may also be referred to as a first resin layer, and the cured article of the second resin may also be referred to as a second resin layer. The cured article 12 of the first resin and the cured article 13 of the second resin may be stacked in the order of the cured article 13 of the second resin and the cured article 12 of the first resin on the first substrate 11. As illustrated in FIG. 1B, a structure may be used in which a second substrate 14 is provided on the cured article 13 of the second resin and the two cured articles of the resins are interposed between the first substrate 11 and the second substrate 14.

Substrate

Examples of a material usable for the first substrate 11 and the second substrate 14 include transparent resins and transparent glasses. As a material for the first substrate 11 and the second substrate 14, a glass can be used. Examples of the glass that can be used include general-purpose optical glasses typified by silicate glasses, borosilicate glasses, and phosphate glasses, silica glasses, and glass ceramics.

Each of the first substrate 11 and the second substrate 14 may have any shape. The shapes of surfaces of the substrates in contact with the cured articles of the resins can be selected from, for example, concave spherical shapes, convex spherical shapes, axisymmetric aspherical shapes, and planar shapes. The shape of the surface of the first substrate 11 in contact with the cured article 12 of the first resin can be the same as that of the surface of the second substrate 14 in contact with the cured article 13 of the second resin. The outside shape of each of the substrates can be circular.

Cured Article of Resin

Each of the two resin layers (the cured article 12 of the first resin and the cured article 13 of the second resin) stacked on the first substrate 11 has a diffraction grating shape. The diffraction grating shape refers to a shape in which multiple diffraction gratings are continuously provided. The grating shape is a repeating pattern of an inclined surface 15A that is gently inclined in the radial direction from the center of the diffractive optical element 20 toward the outer circumference and a wall surface 15B that extends steeply in the opposite direction of the inclination at a predetermined position. The intervals of the repeating patterns decrease consecutively from the center toward the outer circumference. The steps are almost equal.

The cured article 12 of the first resin and the cured article 13 of the second resin are cured articles of transparent resins, the cured articles having different optical characteristics. The refractive indices and the Abbe numbers can be designed in such a manner that the diffractive optical element 20 has desired optical characteristics. To obtain high diffraction efficiency in a wide wavelength range, one of the cured article 12 of the first resin and the cured article 13 of the second resin can have a low refractive index and high dispersion, and the other can have a high refractive index and low dispersion. The low refractive index and the high refractive index used here means the relative relationship between the refractive indices (refractive indices nd for the d line) of the cured article 12 of the first resin and the cured article 13 of the second resin. Similarly, the high dispersion and the low dispersion means the relative relationship between the dispersion characteristics (Abbe number vd) of the cured article 12 of the first resin and the cured article 13 of the second resin. Specifically, the fact that the cured article 12 of the first resin has a high refractive index and low dispersion with respect to the cured article 13 of the second resin indicates that the following relationships are satisfied: nd1>nd2, and v1>v2, where nd1 is the refractive index of the cured article 12 of the first resin, v1 is the Abbe number of the cured article 12 of the first resin, nd2 is the refractive index of the cured article 13 of the second resin, and v2 is the Abbe number of the cured article 13 of the second resin.

The cured article 12 of the first resin is a cured article obtained by curing a first resin composition 12a composed of a photocurable resin or thermosetting resin and contains a thiol group.

Non-limiting examples of a thiol group-containing compound (A) in the first resin composition 12a include 4-mercaptomethyl-1,8-dimercapto-3,6-dithiaoctane, 4,8-bis(mercaptomethyl)-1,11-dimercapto-3,6,9-trithiaundecane, 4,7-bis(mercaptomethyl)-1,11-dimercapto-3,6,9-trithiaundecane, and 5,7-bis(mercaptomethyl)-1,11-dimercapto-3,6,9-trithiaundecane. Oligomers obtained by oligomerization of these compounds using known methods may also be used. The percentage of the compound (A) in the first resin composition 12a is preferably in the range of 40% or more by mass and 80% or less by mass from the viewpoint of achieving the high refractive index and the low dispersion of the cured article 12 of the first resin. When the percentage of the compound (A) is less than 40% by mass, the cured article of the resin may have a low sulfur content to fail to obtain a high refractive index or low dispersion. The percentage of the compound (A) is more preferably in the range of 50% or more by mass to 70% or less by mass.

The first resin composition 12a can contain an ethylenically unsaturated group-containing compound (B). As the ethylenically unsaturated group-containing compound (B), an ene compound that does not contain an aromatic ring can be used and can contain an aliphatic vinyl group from the viewpoint of achieving the high refractive index and the low dispersion of the cured article 12 of the first resin. Specific examples thereof include allyl compounds, such as triallyl isocyanurate, triallyl cyanurate, ethoxylated isocyanuric acid triacrylate, tetraallyloxyethane, and hydrogenated triallyl trimellitate. Further examples thereof include (meth) acrylic compounds, such as oligoethyelene glycol di(meth) acrylate, dimethyloltricyclodecane di(meth)acrylate, trimethylolpropane tri(meth)acrylate, pentaerythritol tetra (meth)acrylate, dipentaerythritol hexa(meth)acrylate, and 2,2'-thiodiethanethiol di(meth)acrylate. These compounds may be used alone or in combination as a mixture. From the viewpoint of achieving a high refractive index of the cured article 12 of the first resin, the cured article of the first resin can contain an isocyanurate. Thus, as the compound (B) contained in the first resin composition 12a, triallyl isocyanurate or triallyl cyanurate can be used. The percentage of the compound (B) in the first resin composition 12a is preferably in the range of 20% or more by mass and 60% or less by mass, more preferably 30% or more by mass and 50% or less by mass.

The first resin composition 12a can contain a compound (A) having at least two thiol groups and a compound (B) having at least two ethylenically unsaturated groups. From the viewpoint of increasing the mechanical strength of the cured article 12 of the first resin, the first resin composition 12a can contain a compound (A) having at least three thiol groups and a compound (B) having at least three ethylenically unsaturated groups.

The first resin composition 12a may contain components other than the compound (A) or the compound (B) as long as the optical characteristics are not significantly impaired. Examples of such a component include solvents, polymerization initiators, surfactants, cross-linking agents, polymer components, antioxidants, and polymerization inhibitors.

The cured article 12 of the first resin can contain, as constituent atoms, carbon atoms, oxygen atoms, and sulfur atoms. The percentage of the sulfur atoms is preferably in the range of 5 at % or more and 35 at % or less based on the total number of these constituent atoms. From the viewpoint of achieving a high refractive index and low dispersion, the percentage of the sulfur atoms is more preferably in the range of 10 at % or more and 25 at % or less. The percentage of the sulfur atoms can be measured, for example, with an energy-dispersive X-ray spectrometer (EDS).

The cured article 12 of the first resin preferably has an elastic modulus of 1 GPa or more and 3 GPa or less. An elastic modulus of more than 3 GPa can result in a decrease in the brittleness of the cured article of the first resin. An elastic modulus of less than 1 GPa can result in a decrease in diffraction efficiency due to grating deformation. The cured article 12 of the first resin more preferably has an elastic modulus of 1.3 GPa or more and 2.0 GPa or less.

The cured article 13 of the second resin is a cured article obtained by curing a second resin composition 13a composed of a photocurable resin or thermosetting resin.

The second resin composition 13a can contain an ethylenically unsaturated group-containing compound (C). From the viewpoint of increasing the diffraction efficiency of the cured article 13 of the second resin, the compound (C) can be an aromatic ring-containing material. Specific examples of the compound (C) include (meth)acrylate compounds, such as (oligo)ethoxylated bisphenol A di(meth)acrylate, (oligo)propoxylated bisphenol A di(meth)acrylate, (oligo) ethoxylated o-phenylphenol (meth)acrylate, 9,9-bis {4-[2-(meth)acryloxyethoxy]phenyl}fluorene, 9,9-bis(4-allyloxyphenyl)fluorene, and bis[2-(meth)acryloyloxyethyl] phthalate; allyl compounds, such as diallyl phthalate, diallyl naphthalene 2,3-dicarboxylate, diallyl naphthalene 2,6-dicarboxylate, and diallyl diphenate; 3-phenoxybenzyl acrylate, o-phenylphenoxyethyl acrylate; and thermoplastic resins obtained by polycarbonation or polyesterification of aromatic diol compounds, such as bisphenol A, 9,9-bis(4-(2-hydroxyethoxy)phenyl)fluorene, and 9,9-bis(4-hydroxy-3-phenylphenyl)fluorene. These compounds may be used alone or in combination as a mixture. From the viewpoint of increasing the mechanical strength of the cured article 13 of the second resin, the compound (C) can contain fluorene or diphenyl ether. From the viewpoint of increasing the interfacial adhesion between the first resin and the second resin, which will be described below, the compound (C) can contain benzyl acrylate or phenoxyethyl acrylate.

The second resin composition 13a may contain components other than the compound (C) as long as the optical characteristics are not significantly impaired. Examples of such a component include solvents, polymerization initiators, surfactants, cross-linking agents, polymer components, antioxidants, and polymerization inhibitors.

Figure 2:
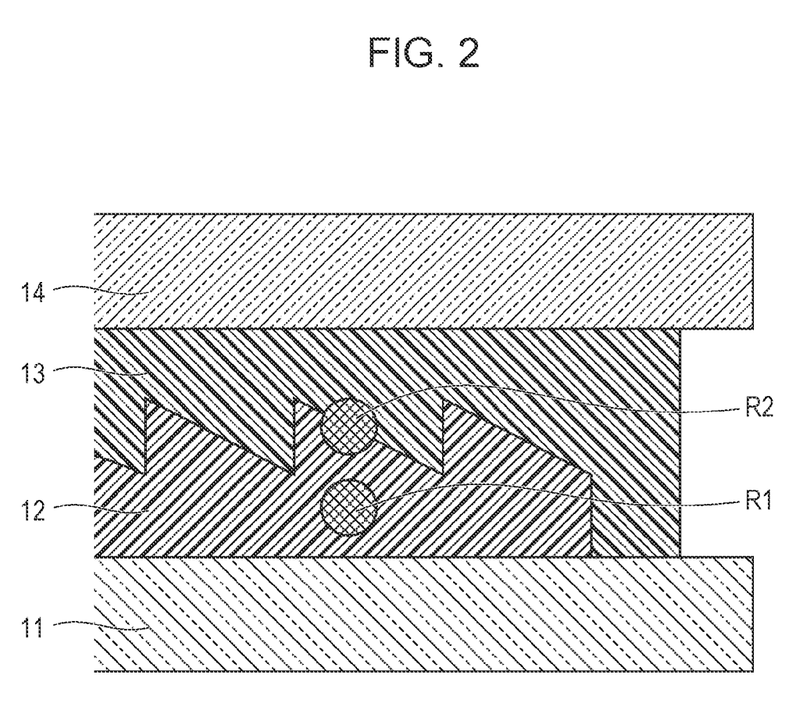
FIG. 2 is a schematic view of a method for evaluating a diffractive optical element according to an embodiment of the present disclosure.

Interface Between Cured Article of First Resin and Cured Article of Second Resin The cured article 12 of the first resin contains sulfide groups. The sulfide group content may differ in the thickness direction of the cured article of the first resin. A region that lies in the cured article 12 of the first resin and that does not contain the interface between the cured article 12 of the first resin and the cured article 13 of the second resin is referred to as a first region R1. A region that contains the interface between the cured article 12 of the first resin and the cured article 13 of the second resin is referred to as a second region R2. The first region R1 and the second region R2 of the diffractive optical element 20 are illustrated in FIG. 2 and lie on a normal line of the contact surface between the first substrate 11 and the cured article 12 of the first resin. The first region R1 is closer to the first substrate 11 than the second region R2. Each of the first region R1 and the second region R2 can have a circular or elliptical shape. When each of the first region R1 and the second region R2 has a circular shape, the diameter thereof is smaller than the total thickness of the two resin layers, i.e., the cured article 12 of the first resin and the cured article 13 of the second resin. When each of the first region R1 and the second region R2 has an elliptical shape, the dimension in the direction of the long side or major axis thereof is smaller than the total thickness of the two resin layers. The size of each of the first region R1 and the second region R2 may be defined as the spot diameter of a beam incident on the two resin layers in laser Raman spectroscopy. The ratio of the number of sulfide groups to the number of thiol groups is higher in the second region R2 than in the first region RE When measurement is performed by laser Raman spectroscopy, the following relationship is satisfied: $\alpha<\beta$, where $\alpha$ is the ratio of the intensity of the peak corresponding to sulfide groups to the intensity of the peak corresponding to thiol groups in the first region R1, and $\beta$ is the ratio of the intensity of the peak corresponding to sulfide groups to the intensity of the peak corresponding to thiol groups in the second region R2. The diffractive optical element 20 according to the first embodiment satisfies the relationship $\alpha<\beta$; thus, peeling is less likely to occur at the interface between the cured article 12 of the first resin and the cured article 13 of the second resin. The mechanism will be described below.

In a diffractive optical element disclosed in Japanese Patent Laid-Open No. 2005-107298, an ultraviolet-curable resin containing an acrylate having an aliphatic ring and a thiol compound and an ultraviolet-curable resin composed of a fluorine-containing acrylate and an acrylate having multiple benzene rings are disposed on a glass substrate. The present inventors, however, have found that in the diffractive optical element disclosed in Japanese Patent Laid-Open No. 2005-107298, peeling occurs at the interface between two resin layers when a curing reaction proceeds excessively during the curing of the ultraviolet-curable resins on the substrate.

In the diffractive optical element disclosed in Japanese Patent Laid-Open No. 2005-107298, the adhesion at the interface between the two resin layers is maintained by a physical anchoring effect due to the shape of the diffraction grating. However, in the case where this diffractive optical element is allowed to stand in a high-temperature and high-humidity environment (for example, a temperature of 60° C. and a humidity of 85%), the two resin layers have different degrees of swelling and different coefficients of linear expansion and thus can differ in volume change due to the penetration of water or a change in temperature. The difference in volume change can cause stress to be applied to the interface between the two resin layers in such a direction as to separate the resin layers from each other; thus, peeling can occur.

The present inventors have found that peeling that occurs at the interface between the two resins can be suppressed by allowing the curing reaction of the cured article of the first resin to proceed appropriately and chemically bonding the cured article of the first resin and the cured article of the second resin together at the interface therebetween during the curing reaction of the cured article of the second resin. Specifically, it was found that the cured article of the first resin and the cured article of the second resin are bonded to each other through sulfide groups at the interface therebetween to obtain higher adhesion than adhesion due to an anchor effect alone. The relationship $\alpha<\beta$ described above indicates that the second region R2 has a larger number of sulfide groups than the first region R1 and has a smaller number of remaining thiol groups that were not used to form the sulfide groups. A production method thereof will be described below.

$\alpha$ and $\beta$ can satisfy the relationship $0.2 \leq \alpha/\beta \leq 0.8$. When $\alpha$ and $\beta$ satisfy this relationship, a higher adhesion between the two resins is obtained. When $\alpha/\beta$ is less than 0.2, the second region R2 has a large number of remaining thiol groups, thereby possibly leading to insufficient strength of the grating shape in this method. The fact that $\alpha/\beta$ is more than 0.8 indicates a small difference in the number of sulfide groups between the first region R1 and the second region R2. In other words, the fact that $\alpha/\beta$ is more than 0.8 indicates a relatively smaller number of bonds through the sulfide groups at the interface between the cured article of the first resin and the cured article of the second resin; thus, the interfacial adhesion may be insufficient. In the diffractive optical element disclosed in Japanese Patent Laid-Open No. 2005-107298, when the curing reaction proceeds excessively during the curing of the ultraviolet-curable resins on the substrate, the first region R1 and the second region R2 have the same number of sulfide groups, i.e., $\alpha/\beta=1$.

A measurement method in laser Raman spectroscopy is not particularly limited. The conditions, such as an objective lens and spatial resolution, can be appropriately adjusted. A measurement point in the first region R1 can be adjusted in such a manner that the cured article 13 of the second resin is excluded from the measurement target in consideration of the thickness of the cured article 12 of the first resin. The area of the measurement point of the second region R2 can be the same as that of the first region R1 and can be adjusted in such a manner that the interface between the cured article 12 of the first resin and the cured article 13 of the second resin is included in the measurement target. A peak corresponding to a thiol group appears at about 2,560 cm$^{-1}$, and a peak corresponding to a sulfide group appears at about 700 cm$^{-1}$.

Method for Producing Diffractive Optical Element

A method for producing a diffractive optical element according to an embodiment of the present disclosure will be described below. An example of a method for producing a diffractive optical element using ultraviolet-curable resins will be described below, the diffractive optical element including two resin layers disposed between two glass substrates.

To improve the adhesion of the glass substrates to the resin layers, the surfaces of the glass substrates to be brought into contact with the resin layers can be subjected to pretreatment. The pretreatment for the glass surfaces can be coupling treatment with a silane coupling agent having a good affinity for the resin layers. Specific examples of the coupling agent include hexamethyldisilazane, methyltrimethoxysilane, trimethylchlorosilane, and triethylchlorosilane.

Figure 3A:
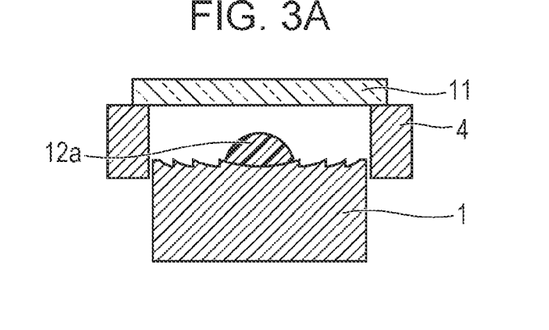
FIGS. 3A to 3E are schematic views of a method for producing a diffractive optical element according to an embodiment of the present disclosure.

In this production method, the cured article 12 of the first resin is first formed. As illustrated in FIG. 3A, an ultraviolet-curable resin serving as the first resin composition 12a that is a precursor of the cured article 12 of the first resin is dropped onto a metal mold 1. The first substrate 11 is placed on an ejector 4 and arranged so as to face the metal mold 1. The metal mold 1 used here has a surface with the inverse shape of the shape of a desired diffraction grating and can be produced, for example, by cutting a base metal, such as a stainless steel material or steel material, plated with NiP or oxygen-free copper using a precision machine tool.

Figure 3B:
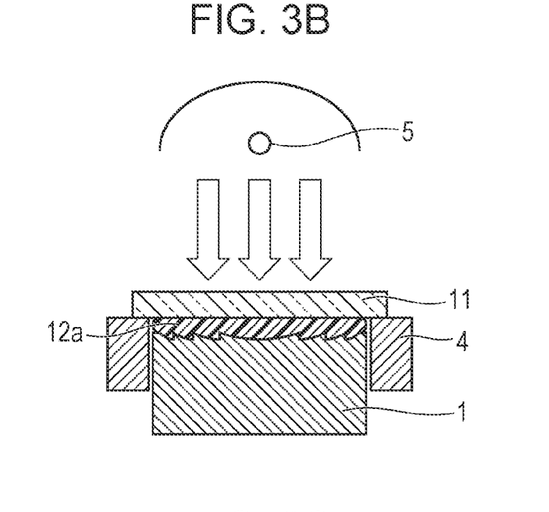

As illustrated in FIG. 3B, the ejector 4 is then lowered to fill the gap between the metal mold 1 and the first substrate 11 with the ultraviolet-curable resin. The ultraviolet-curable resin is cured by ultraviolet irradiation from the first substrate 11 side using an ultraviolet light source 5 to provide the cured article 12 of the first resin.

Figure 3C:
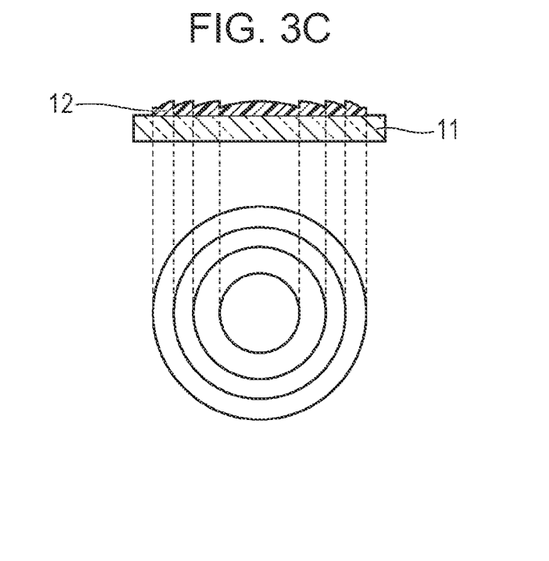

As illustrated in FIG. 3C, the cured article 12 of the first resin is released from the metal mold 1. The cured article 12 of the first resin may be subjected to heat annealing, additional ultraviolet irradiation, or heating or ultraviolet irradiation in an oxygen atmosphere.

Figure 4:
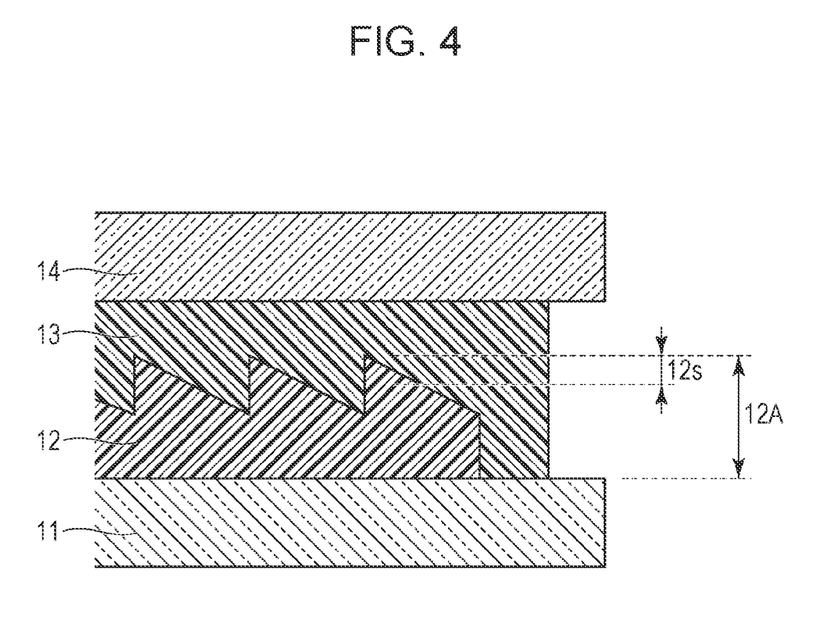
FIG. 4 is a schematic view of a diffractive optical element according to an embodiment of the present disclosure.

The degree of cure at a surface of the cured article 12 of the first resin can be in the range of 50% or more and 80% or less. A surface 12s of the cured article 12 of the first resin refers to, as illustrated in FIG. 4, a portion extending from a surface of the cured article 12 of the first resin, the surface having the shape of the diffraction grating, to a depth of 10% of the thickness 12A of the cured article 12 of the first resin. The thickness 12A of the cured article of the first resin refers to the distance from a surface of the first substrate 11 to an apex of the grating of the cured article 12 of the first resin in the direction of the optical axis. In the case where the degree of cure at the surface of the cured article 12 of the first resin is in the range of 50% or more and 80% or less, a certain number of thiol groups, which are reactive functional groups, remain unreacted on the surface of the cured article of the first resin. The remaining thiol groups react with the ethylenically unsaturated groups contained in the second resin composition 13a during the curing of the second resin composition 13a to form sulfide bonds between the cured article 12 of the first resin and the cured article 13 of the second resin. This can enhance the adhesion between the cured article 12 of the first resin and the cured article 13 of the second resin.

If the degree of cure at the surface of the cured article 12 of the first resin is less than 50%, the grating can deform to lead to insufficient diffraction efficiency when the cured article 13 of the second resin is stacked and released by lifting the ejector 4 in the subsequent step. A degree of cure of more than 80% can lead to an insufficient number of sulfide groups formed to fail to achieve sufficient adhesion between the cured article 12 of the first resin and the cured article 13 of the second resin.

The degree of cure inside the cured article 12 of the first resin can be higher than that at the surface 12s. This is because the cure shrinkage of the cured article 13 of the second resin at the time of forming the cured article of the second resin is reduced to suppress the deformation of the grating shape of the cured article 12 of the first resin.

The degree of cure at the surface of the cured article 12 of the first resin can be measured with a Raman spectrometer. For example, the degree of cure can be determined by measuring the intensity of a peak corresponding to ester groups (CO), which are unreacted groups in the cured article of the first resin, at about 1,740 cm$^{-1}$ and the intensity of a peak corresponding to thiol groups (SH), which are reacted groups, at about 2,560 cm$^{-1}$ before and after curing and performing calculation using the following formula.

$$\text{Degree of cure} = \frac{1 - (SH/CO)_{after\ curing}}{1 - (SH/CO)_{before\ curing}} \times 100\% \quad \text{(formula)}$$

A method for adjusting the degree of cure at the surface of the cured article of the first resin is not particularly limited. For example, the degree of cure can be controlled in the range of 50% or more and 80% or less by performing heat annealing in an oxygen atmosphere when the first resin composition 12a is cured by ultraviolet irradiation. Exposure of the surface of the cured article of the first resin to oxygen enables suppression of an excessive curing reaction. The temperature and time of the heat annealing are not particularly limited. The temperature can be in the range of 50° C. or higher and 140° C. or lower. The time can be in the range of 1 hour or more to 48 hours or less. The oxygen concentration in the oxygen-containing atmosphere can be in the range of 20% or more and 100% or less. The degree of cure can be adjusted by a method other than the heat annealing. For example, the following procedure may be used: the degree of cure at the surface of the cured article of the first resin is set to 80% or more, the first resin composition 12a is applied to the surface 12s of the cured article of the first resin, and the degree of cure at the surface is set to 80% or less on average. After that, it is possible to control the number of sulfide bonds by ultraviolet irradiation or heat annealing.

Figure 3D:
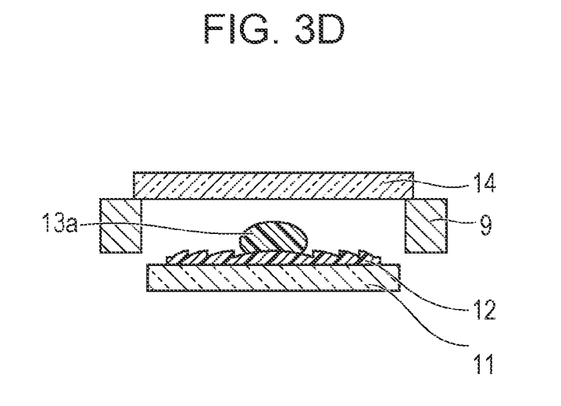

Next, the cured article of the second resin is formed. As illustrated in FIG. 3D, an uncured ultraviolet-curable resin serving as a second resin composition that is a precursor of the cured article 13 of the second resin is dropped onto the cured article 12 of the first resin. The second substrate 14 is placed on an ejector 9 and arranged so as to face the first substrate 11. The second resin composition 13a is another resin that differs in optical characteristics, such as a refractive index and the Abbe number, from the first resin composition 12a.

Figure 3E:
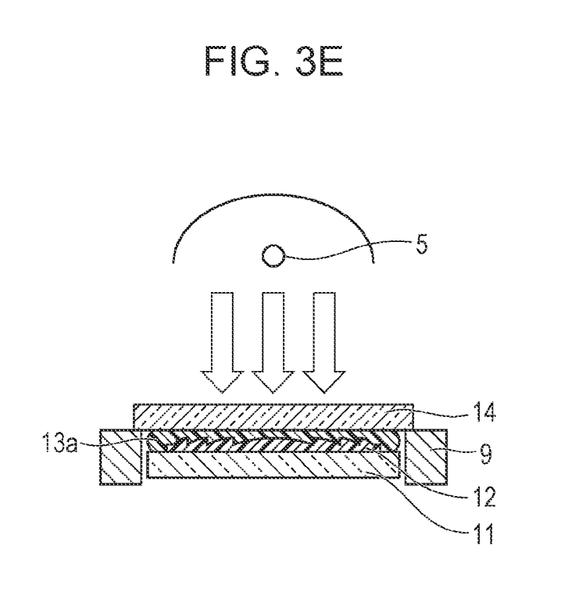

As illustrated in FIG. 3E, the ejector 9 is then lowered to fill the gap between the first substrate 11 and the second substrate 14 and between the cured article 12 of the first resin and the second substrate 14 with the uncured ultraviolet-curable resin. The ultraviolet-curable resin is cured by ultraviolet irradiation from the second substrate 14 side using the ultraviolet light source 5 to form the cured article 13 of the second resin. At this time, the cured article 12 of the first resin and the cured article 13 of the second resin are chemically bonded to each other through sulfide groups at the interface therebetween. In the cured article 12 of the first resin, the second region R2 has a higher sulfide group content than the first region RE Thereby, the diffractive optical element 20 is produced. After the formation of the cured article 13 of the second resin, heat annealing, additional ultraviolet irradiation, or heating or ultraviolet irradiation in an oxygen-free atmosphere may be performed.

After the formation of the cured article 13 of the second resin, the second substrate 14 may be separated.

Image Pickup Apparatus

Figure 5:
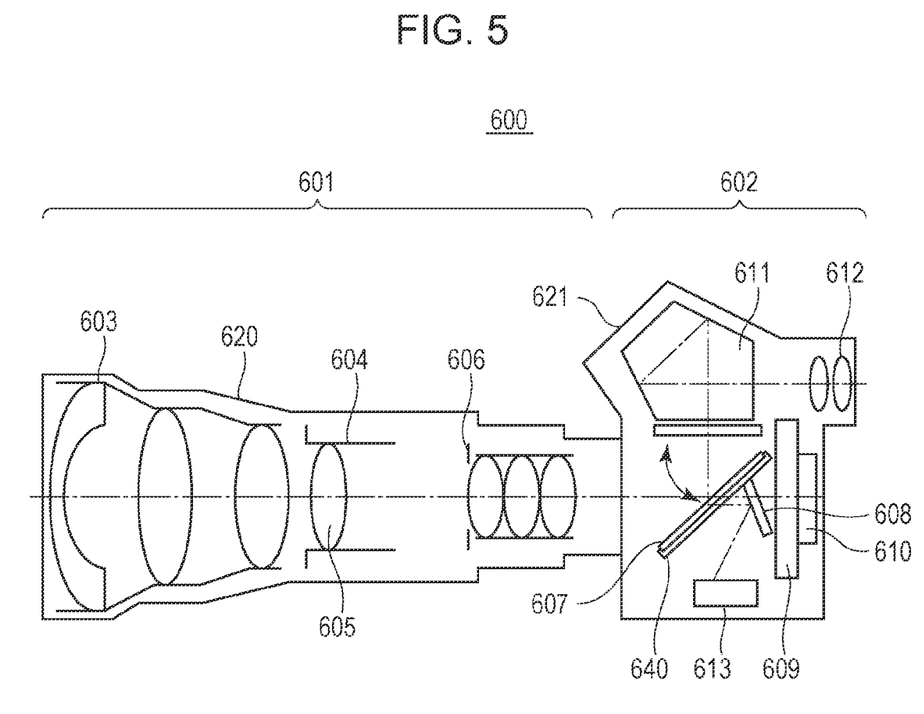
FIG. 5 is a schematic view of an image pickup apparatus according to an embodiment of the present disclosure.

FIG. 5 illustrates the structure of a digital single-lens reflex camera as an example of an image pickup apparatus according to an embodiment of the present disclosure. In FIG. 5, a lens barrel 601, which is an optical device, is attached to a camera body 602. However, the lens barrel 601 is what is called an interchangeable lens detachable from the camera body 602.

Light from an object passes through an optical system including multiple lenses 603 and 605 and other lenses arranged on the optical axis of an imaging optical system in a housing 620 of the lens barrel 601 and then received by an image pickup element 610. The diffractive optical element according to an embodiment of the present disclosure can be used, for example, for the lens 605.

The lens 605 is movably supported by an inner cylinder 604 in the housing for focusing and zooming with respect to the outer cylinder of the lens barrel 601.

During the period of observation before shooting, light from an object is reflected by a main mirror 607 in the housing 621 of the camera body and passes through a prism 611. A captured image is projected to a photographer through viewfinder lenses 612. The main mirror 607 is, for example, a half mirror. Light passing through the main mirror is reflected by a sub-mirror 608 toward an autofocus (AF) unit 613. This reflected light is used for autofocusing. The main mirror 607 is attached by bonding or the like to a main-mirror holder 640 and supported. At the time of shooting, the main mirror 607 and the sub-mirror 608 are moved out of the optical path with a driving mechanism (not illustrated), a shutter 609 is opened, and light passes through the lens barrel 601 to form an optical image on the image pickup element 610. A diaphragm 606 is configured in such a manner that the brightness and the depth of focus at the time of shooting can be changed by changing the aperture area.

EXAMPLES

The present disclosure will be described in more detail by examples.

Example 1

Production of Diffractive Optical Element

As the first substrate 11, a glass lens composed of S-TIM 8 (available from Ohara Inc.) was used, the glass lens having a diameter of 60 mm, a first surface being flat, and a second surface having a concave spherical shape with a radius of curvature R of 190 mm. As the second substrate 14, a glass lens composed of S-FSL 5 (available from Ohara Inc.) was used, the glass lens having a diameter of 58 mm, a first surface having a convex spherical shape with a radius of curvature R of 70 mm, and a second surface having a convex spherical shape with a radius of curvature R of 190 mm. As the metal mold 1, a member having the inverse shape of a desired shape of a first grating and its circumference was used, the inverse shape being formed by cutting a layer of NiP plating on a base metal using a precision machine tool.

The first resin composition 12a was prepared as follows: 58 parts by mass of 4-mercaptomethyl-3,6-dithia-1,8-octanedithiol serving as a component of the compound (B), 40 parts by mass of triallyl isocyanurate serving as a component of the compound (A), and 2 parts by mass of 1-hydroxycyclohexyl phenyl ketone serving as a polymerization initiator were mixed using a rotation and revolution mixer ARV-310 (available from Thinky Corporation) until a uniform mixture was obtained, thereby preparing the first resin composition 12a.

The second resin composition 13a was then prepared as follows: 63 parts by mass of ethoxylated bisphenol A diacrylate, 35 parts by mass of 9,9-bis[4-(2-acryloxyethoxy)phenyl]fluorene, which served as components of the compound (C), and 2 parts by mass of 1-hydroxycyclohexyl phenyl ketone serving as a polymerization initiator were mixed using the rotation and revolution mixer ARV-310 (available from Thinky Corporation) until a uniform mixture was obtained, thereby preparing the second resin composition 13a.

The first resin composition 12a was filled into the gap between the metal mold 1 and the first substrate 11. The first resin composition 12a was cured by irradiation with ultraviolet radiation having a wavelength of 365 nm and an intensity of 10 mW/cm$^2$ for 200 seconds and released from the mold to form the cured article 12 of the first resin on the first substrate 11. The cured article 12 of the first resin was placed in an oven in this state and heated in vacuum at 80° C. for 24 hours. A diluted solution of the first resin composition was then applied by spraying to a surface of the cured article of the first resin. After the spray application, drying was performed. The dry composition was placed in an oven under an oxygen/nitrogen (1:1) atmosphere and heated at 80° C. for 24 hours.

The degree of cure at a first annular zone of a surface of the resulting cured article 12 of the first resin was measured with a laser Raman spectrophotometer (available from Horiba, Ltd.) and found to be 65%. The degree of cure at the inside thereof was found to be 85%.

The second resin composition 13a was filled into the gap between the cured article 12 of the first resin and the second substrate 14 and irradiated with ultraviolet radiation for 200 seconds, thereby curing the second resin composition 13a. Then the composition was irradiated with ultraviolet radiation having a wavelength of 365 nm and an intensity of 30 mW/cm$^2$ for 1,000 seconds. Finally, the composition was placed in an oven and heated in vacuum at 80° C. for 72 hours to provide the diffractive optical element 20 of Example 1. In the resulting diffractive optical element, a thickness excluding the grating of the cured article of the first resin was 30 μm, a thickness excluding the grating of the cured article of the second resin was 50 μm, and the height of the grating was 20 μm. The cured article of the first resin had a refractive index of 1.62 and an Abbe number of 40. The cured article of the second resin had a refractive index of 1.59 and an Abbe number of 29.

Evaluation of Diffractive Optical Element

The state of sulfide bonds at the interface between the cured article 12 of the first resin and the cured article 13 of the second resin of the diffractive optical element 20 of Example 1 was evaluated with a laser Raman spectrophotometer. α, which is the ratio of the intensity of the peak corresponding to sulfide groups to the intensity of the peak corresponding to thiol groups in the first region R1, and β, which is the ratio of the intensity of the peak corresponding to sulfide groups to the intensity of the peak corresponding to thiol groups in the second region R2, were evaluated. The measurement conditions were as follows: laser wavelength: 532 nm, magnification of objective lens: ×50, hole: 117 μm, slit: 140 μm, and grating: 600 grooves/mm. The intensity of the peak observed at 2,560 cm$^{-1}$ was measured for thiol groups. The intensity of the peak observed at 700 cm$^{-1}$ was measured for sulfide groups. Regarding the peak of the sulfide groups, the intensity after peak resolution by fitting with the Lorentz function was used for calculation.

The indentation elastic modulus of the cured article 12 of the first resin of the diffractive optical element 20 of Example 1 was measured with a NanoIndenter G-200 (available from Agilent Technologies, Inc). The first substrate 11 was ground to expose the cured article of the first resin, and then the measurement was performed.

The diffractive optical element 20 of Example 1 was subjected to a durability test in a high-temperature and high-humidity environment (60° C., 85 RH %, 2,000 hours), and whether the peeling of the resin occurred was visually observed. An element in which peeling occurred in less than 1,000 hours was rated as C. An element in which peeling occurred after 1,000 hours was rated as B. An element in which peeling did not occur until 2,000 hours was rated as A.

The diffraction efficiency of the diffractive optical element 20 of Example 1 was evaluated. The average diffraction efficiency of the diffractive optical element was measured by allowing a measurement light beam having a diameter of about 2 mm and a wavelength of 400 nm to 700 nm to be incident on the peripheral portion of the grating shape and detecting the intensity of primary diffracted light. An element having a diffraction efficiency of 90% or more was rated as A. An element having a diffraction efficiency of less than 90% was rated as B.

Table 1 presents the evaluation results of the diffractive optical element 20 of Example 1. Table 2 summarizes the compounds used in Example 1.

Example 2

A diffractive optical element of Example 2 was produced under the same conditions as in Example 1, except that in the step of forming the cured article 12 of the first resin, heating in vacuum and the spray application of the diluted solution of the resin composition 12a were not performed, and the ratio of oxygen to nitrogen during heating in the oven was changed to 1:9.

Example 3

A diffractive optical element of Example 3 was produced under the same conditions as in Example 1, except that in the step of forming the cured article 12 of the first resin, heating in vacuum and the spray application of the diluted solution of the resin composition 12a were not performed, and the ratio of oxygen to nitrogen during heating in the oven was changed to 8:2.

Example 4

A diffractive optical element of Example 4 was produced under the same conditions as in Example 1, except that in the step of preparing the first resin composition, ethoxylated isocyanuric acid triacrylate was used as the component of the compound (A).

Example 5

A diffractive optical element of Example 5 was produced under the same conditions as in Example 1, except that in the step of preparing the second resin composition, the component of the compound (C) was changed from that in Example 1, i.e., 57 parts by mass of ethoxylated bisphenol A diacrylate, 26 parts by mass of 9,9-bis[4-(2-acryloxyethoxy)phenyl]fluorene, and 15 parts by mass of 3-phenoxybenzyl acrylate were used.

Example 6

A diffractive optical element of Example 6 was produced under the same conditions as in Example 1, except that in the step of preparing the second resin composition, 48 parts by mass of diallyl naphthalene 2,3-dicarboxylate, 35 parts by mass of 9,9-bis(4-allyloxyphenyl)fluorene, and 15 parts by mass of 3-phenoxybenzyl acrylate were used as the components of the compound (C).

Example 7

A diffractive optical element of Example 7 was produced under the same conditions as in Example 1, except that in the step of preparing the first resin composition 12a, 58 parts by mass of 4,8-mercaptomethyl-1,11-dimercapto-3,6,9-trithiaundecane was used as the component of the compound (B) and 40 parts by mass of tetraallyloxyethane was used as the component of the compound (A).

Example 8

A diffractive optical element of Example 8 was produced under the same conditions as in Example 1, except that after the cured article of the second resin was formed on the second substrate 14, the cured article of the first resin was formed.

Example 9

A diffractive optical element of Example 9 was produced under the same conditions as in Example 1, except that in the step of forming the cured article of the second resin, the metal mold 1 was used in place of the second substrate 14, and the metal mold 1 was released.

Comparative Example 1

A diffractive optical element of Comparative example 1 was produced under the same conditions as in Example 8, except that in the step of forming the cured article of the second resin on the second substrate 14, the second resin composition 13a was hermetically sealed with the metal mold 1 and the second substrate 14 and heated at 80° C. for 24 hours, and the degree of cure at the surface of the cured article of the second resin was 85%.

Comparative Example 2

A diffractive optical element of Comparative example 2 was produced under the same conditions as in Example 1, except that in the step of forming the cured article of the first resin, the first resin composition 12a was hermetically sealed with the metal mold 1 and the first substrate 11 and cured by heating at 130° C. for 2 hours, and in the step of forming the cured article of the second resin, the second resin composition was cured by ultraviolet irradiation for 2 minutes with a high-pressure mercury lamp from the first substrate 11 side.

Comparative Example 3

A diffractive optical element of Comparative example 3 was produced under the same conditions as in Example 1, except that in the step of forming the cured article of the first resin, curing was performed by ultraviolet irradiation until the degree of cure at the surface of the cured article of the first resin reached 85%.

TABLE 1

| | Material composition | Degree of cure of cured article of first resin [%] | α | β | α/β | Elastic modulus of cured article of first resin [GPa] | Diffraction efficiency [%] | Evaluation of diffraction efficiency | Durability evaluation |
|---|---|---|---|---|---|---|---|---|---|
| Example 1 | Formulation 1 | 65 | 3.2 | 4.8 | 0.7 | 1.5 | 97.0 | A | B |
| Example 2 | Formulation 1 | 75 | 3.4 | 3.7 | 0.9 | 1.5 | 97.6 | A | B |
| Example 3 | Formulation 1 | 50 | 3.3 | 9.1 | 0.4 | 1.5 | 96.4 | A | B |
| Example 4 | Formulation 2 | 65 | 3.3 | 5.0 | 0.7 | 1.1 | 90.4 | A | B |
| Example 5 | Formulation 3 | 65 | 3.4 | 5.3 | 0.7 | 1.5 | 97.2 | A | A |
| Example 6 | Formulation 4 | 65 | 3.4 | 4.8 | 0.7 | 1.5 | 97.2 | A | A |
| Example 7 | Formulation 5 | 65 | 3.3 | 5.0 | 0.7 | 3.2 | 98.0 | A | B |
| Example 8 | Formulation 1 | 65 | 3.2 | 5.0 | 0.6 | 1.1 | 95.0 | A | B |
| Example 9 | Formulation 1 | 65 | 3.4 | 4.8 | 0.7 | 1.1 | 95.1 | A | B |
| Comparative example 1 | Formulation 1 | 85 | 3.4 | 3.4 | 1.0 | 1.1 | 96.1 | A | C |
| Comparative example 2 | Formulation 1 | 85 | 3.2 | 3.2 | 1.0 | 1.1 | 96.0 | A | C |
| Comparative example 3 | Formulation 1 | 85 | 3.2 | 3.2 | 1.0 | 0.9 | 93.2 | A | C |

TABLE 2

| | First resin composition | Parts by mass | Second resin composition | Parts by mass |
|---|---|---|---|---|
| Formulation 1 | 4-mercaptomethyl-3,6-dithia-1,8-octanedithiol Chemwill Asia Co., Ltd. | 58 | bisphenol A ethoxylate diacrylate Shin-Nakamura Chemical Co., Ltd. | 63 |
| | triallyl isocyanurate Tokyo Chemical Industry Co., Ltd. | 40 | 9,9-bis[4-(2-hydroxyethoxy)phenyl]fluorene Shin-Nakamura Chemical Co., Ltd. | 35 |
| | 1-hydroxycyclohexyl phenyl ketone BASF Japan Ltd. | 2 | 1-hydroxycyclohexyl phenyl ketone BASF Japan Ltd. | 2 |
| Formulation 2 | 4-mercaptomethyl-3,6-dithia-1,8-octanedithiol Chemwill Asia Co., Ltd. | 58 | bisphenol A ethoxylate diacrylate Shin-Nakamura Chemical Co., Ltd. | 63 |
| | ethoxylated isocyanurate triacrylate Shin-Nakamura Chemical Co., Ltd. | 40 | 9,9-bis[4-(2-hydroxyethoxy)phenyl]fluoreneS hin-Nakamura Chemical Co., Ltd. | 35 |
| | 1-hydroxycyclohexyl phenyl ketone BASF Japan Ltd. | 2 | 1-hydroxycyclohexyl phenyl ketone BASF Japan Ltd. | 2 |
| Formulation 3 | 4-mercaptomethyl-3,6-dithia-1,8-octanedithiol Chemwill Asia Co., Ltd. | 58 | bisphenol A ethoxylate diacrylate Shin-Nakamura Chemical Co., Ltd. | 57 |
| | triallyl isocyanurate Tokyo Chemical Industry Co., Ltd. | 40 | 9,9-bis[4-(2-hydroxyethoxy)phenyl]fluorene Shin-Nakamura Chemical Co., Ltd. | 26 |
| | 1-hydroxycyclohexyl phenyl ketone BASF Japan Ltd. | 2 | 3-phenoxybenzyl acrylate Kyoeisha Chemical Co., Ltd. | 15 |
| | | | 1-hydroxycyclohexyl phenyl ketone BASF Japan Ltd. | 2 |
| Formulation 4 | 4-mercaptomethyl-3,6-dithia-1,8-octanedithiol Chemwill Asia Co., Ltd. | 58 | diallyl naphthalene 2,3-dicarboxylate Nisshoku Techno Fine Chemical Co., Ltd. | 48 |
| | triallyl isocyanurate Tokyo Chemical Industry Co., Ltd. | 40 | 9,9-bis(4-allyloxyphenyl)fluorene Tokyo Chemical Industry Co., Ltd. | 35 |
| | 1-hydroxycyclohexyl phenyl ketone BASF Japan Ltd. | 2 | 3-phenoxybenzyl acrylate Kyoeisha Chemical Co., Ltd. | 15 |
| | | | 1-hydroxycyclohexyl phenyl ketone BASF Japan Ltd. | 2 |
| Formulation 5 | 4,8-mercaptomethyl-1,11-dimercapto-3,6,9-trithiaundecane synthesized by method described in Japanese Patent No. 3444682 | 58 | bisphenol A ethoxylate diacrylate Shin-Nakamura Chemical Co., Ltd. | 63 |
| | tetraallyloxyethane Tokyo Chemical Industry Co., Ltd. | 40 | 9,9-bis[4-(2-hydroxyethoxy)phenyl]fluorene Shin-Nakamura Chemical Co., Ltd. | 35 |
| | 1-hydroxycyclohexyl phenyl ketone BASF Japan Ltd. | 2 | 1-hydroxycyclohexyl phenyl ketone BASF Japan Ltd. | 2 |

As given in Tables 1 and 2, in Examples 1 to 9 in which the relationship β>α was satisfied, peeling did not occur after 1,000 hours had passed in the durability test, whereas in Comparative examples 1 to 3 in which β=α, peeling occurred before 1,000 hours had passed.

Among Examples 1 to 9, in Examples 5 and 6 in which formulations 3 and 4 were used, peeling did not occur after 2,000 hours had passed. This is presumably attributed to the formation of diphenyl ether in the cured article of the second resin by the use of 3-phenoxybenzyl acrylate.

According to an embodiment of the present disclosure, a diffractive optical element in which peeling is less likely to occur at the interface between two resins even if the element is exposed to a high-temperature and high-humidity environment (for example, at a temperature of 60° C. and a humidity of 85%) for a long time can be provided.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-213739, filed Nov. 26, 2019, which is hereby incorporated by reference herein in its entirety.

What is claimed is:

1. A diffractive optical element, comprising:
two resin layers,
wherein one of the two resin layers is a first resin layer having a diffraction grating shape and containing a thiol group and a sulfide group,
wherein the other of the two resin layers is a second resin layer having a diffraction grating shape,
wherein when measurement is performed by laser Raman spectroscopy, $\alpha<\beta$, where $\alpha$ is a ratio of intensity of a peak corresponding to the sulfide group to intensity of a peak corresponding to the thiol group in a first region of the first resin layer, the first region containing no interface between the first resin layer and the second resin layer, and $\beta$ is a ratio of intensity of a peak corresponding to the sulfide group to intensity of a peak corresponding to the thiol group in a second region containing an interface between the first resin layer and the second resin layer, the second region being smaller than a total thickness of the two resin layers.

2. The diffractive optical element according to claim 1, wherein $\alpha$ and $\beta$ satisfy the relationship:

$$0.2 \leq \alpha/\beta \leq 0.8.$$

3. The diffractive optical element according to claim 1, wherein the first resin layer contains a cured article of an isocyanurate-containing resin.

4. The diffractive optical element according to claim 1, wherein the second resin layer contains a cured article of a resin containing an acrylate having a benzene ring.

5. The diffractive optical element according to claim 4, wherein the second resin layer contains a cured article of a resin containing fluorene and/or diphenyl ether.

6. The diffractive optical element according to claim 1, wherein the first resin layer has an elastic modulus of 1 GPa or more and 3 GPa or less.

7. The diffractive optical element according to claim 1, wherein the first resin layer has a higher refractive index than the second resin layer, and the first resin layer has a higher Abbe number than the second resin layer.

8. The diffractive optical element according to claim 1, wherein the diffractive optical element further comprises a second substrate,
wherein the two resin layers are disposed between the first substrate and the second substrate.

9. An optical device, comprising:
a housing; and
an optical system including multiple lenses in the housing,
wherein at least one of the multiple lenses is the diffractive optical element according to claim 1.

10. An image pickup apparatus, comprising:
a housing;
an optical system including multiple lenses in the housing; and
an image pickup element that receives light passing through the optical system,
wherein at least one of the multiple lenses is the diffractive optical element according to claim 1.

11. The image pickup apparatus according to claim 10, wherein the image pickup apparatus is a camera.

12. A method for producing a diffractive optical element, comprising:
forming a first resin layer having a diffraction grating shape by disposing a thiol group-containing first resin composition on a first substrate; and
forming a second resin layer having a diffraction grating shape by disposing a second resin composition on the first resin layer,
wherein in forming the second resin layer, the second resin composition is cured to satisfy $\alpha<\beta$, where $\alpha$ is a ratio of intensity of a peak corresponding to a sulfide group to intensity of a peak corresponding to the thiol group in a first region of the first resin layer, the first region containing no interface between the first resin layer and the second resin layer, and $\beta$ is a ratio of intensity of a peak corresponding to the sulfide group to intensity of a peak corresponding to the thiol group in a second region containing an interface between the first resin layer and the second resin layer, the second region being smaller than a total thickness of the two resin layers, these peaks being measured by laser Raman spectroscopy.

13. The method according to claim 12, wherein in forming the first resin layer, a degree of cure at a surface of the first resin layer having the diffraction grating shape is 50% or more and 80% or less.

14. The method according to claim 12, wherein the first resin composition contains a compound having at least three thiol groups and a compound at least three ethylenically unsaturated groups.

15. The method according to claim 14, wherein the compound having at least three ethylenically unsaturated groups contains an aliphatic vinyl group.

16. The method according to claim 12, wherein the second resin composition contains an aromatic ring.

17. The method according to claim 16, wherein the second resin composition contains benzyl acrylate and/or phenoxyethyl acrylate.

18. The diffractive optical element according to claim 1, wherein the diffractive optical element further comprises a first substrate, and
wherein the two resin layers are disposed on the first substrate.

* * * * *